(12) United States Patent
Roskamp et al.

(10) Patent No.: US 11,047,525 B2
(45) Date of Patent: *Jun. 29, 2021

(54) QUICK RELEASE EQUIPMENT MOUNT

(71) Applicants: Daniel Roskamp, San Clemente, CA (US); Randall Roskamp, San Clemente, CA (US); Roger J. Malcolm, San Clemente, CA (US)

(72) Inventors: Daniel Roskamp, San Clemente, CA (US); Randall Roskamp, San Clemente, CA (US); Roger J. Malcolm, San Clemente, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/555,184

(22) Filed: Aug. 29, 2019

(65) Prior Publication Data

US 2019/0383439 A1 Dec. 19, 2019

Related U.S. Application Data

(63) Continuation of application No. 15/459,419, filed on Mar. 15, 2017, now Pat. No. 10,415,745.

(51) Int. Cl.
*A62C 13/78* (2006.01)
*F16M 13/02* (2006.01)
*F16B 9/02* (2006.01)
*F16M 11/04* (2006.01)
*F16M 11/22* (2006.01)
*F16B 2/08* (2006.01)

(52) U.S. Cl.
CPC ............ *F16M 13/02* (2013.01); *A62C 13/78* (2013.01); *F16B 9/02* (2013.01); *F16M 11/041* (2013.01); *F16M 11/22* (2013.01); *F16B 2/08* (2013.01); *F16M 2200/024* (2013.01)

(58) Field of Classification Search
USPC ....... 248/225.21, 304, 305, 306, 339, 219.3, 248/219.4, 220.22, 225.11; 211/71.01, 211/85.18, 113
See application file for complete search history.

(56) References Cited

U.S. PATENT DOCUMENTS 10,415,745 B2 * 9/2019 Roskamp ............... F16B 9/02
2005/0269470 A1 * 12/2005 Ficarra ................. B63C 11/02
248/304

* cited by examiner

*Primary Examiner* — Alfred J Wujciak
(74) *Attorney, Agent, or Firm* — Charmasson, Buchaca & Leach, LLP

(57) ABSTRACT

A quick release equipment mount includes a support module secured to a fixture such as a wall or pipe and a number of item modules, each of which can attach to an item of equipment such as a fire extinguisher for quick release. The item modules can have two pair of vertically spaced apart hooks which engage two pair of commensurately spaced apart posts extending laterally from an elongated vertical tongue extending from the support module. The hooks are formed on a pair of rails spaced to form a groove slidingly engaged by the tongue. Item modules can have different item interfacing segments for securing in various manners to various types of equipment items while all having similar support module interfacing segments capable of quick release mounting to the support module.

16 Claims, 2 Drawing Sheets

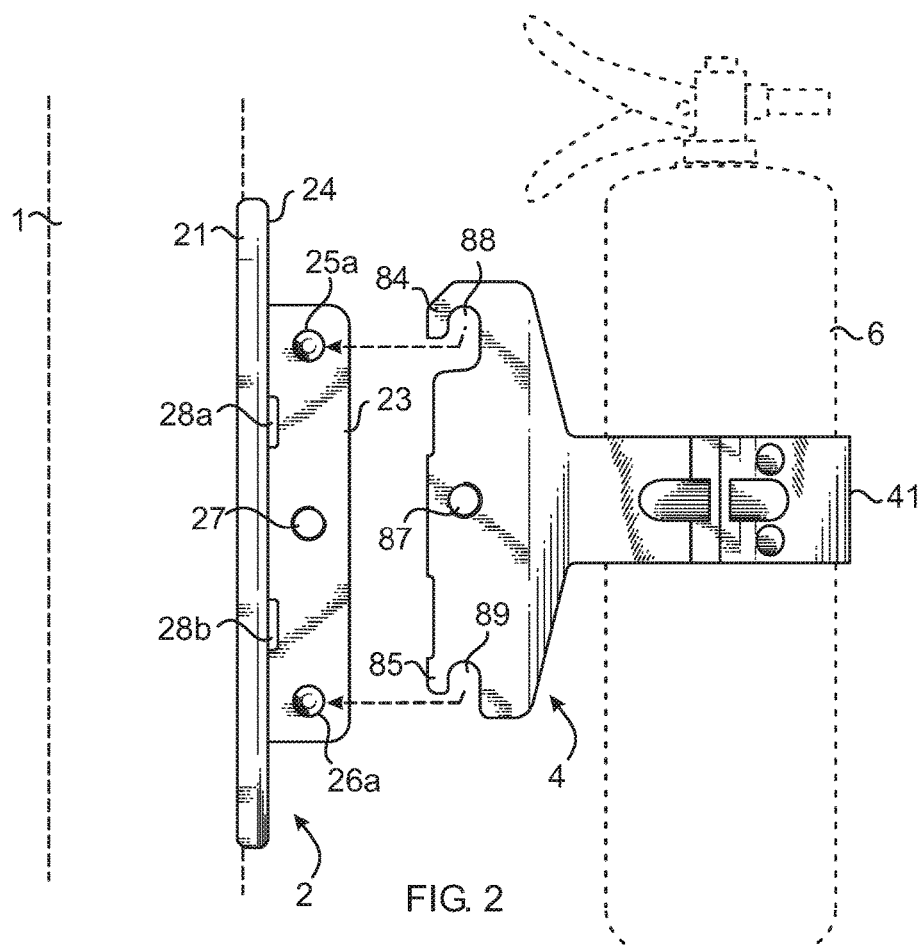
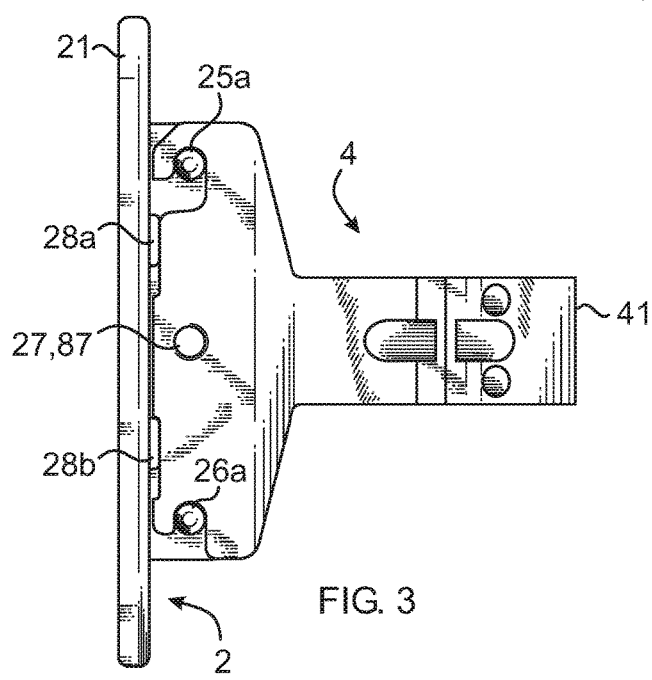
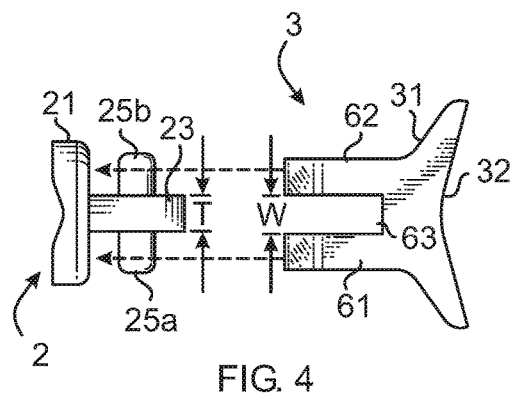

QUICK RELEASE EQUIPMENT MOUNT

PRIOR APPLICATION

This application is a divisional of copending U.S. patent application Ser. No. 15/459,419, filed 2017 Mar. 15, which claims the benefit of U.S. Provisional Utility Patent Application Ser. No. 62/309,345, filed 2016 Mar. 16, both of which are incorporated herein by reference.

FIELD OF THE INVENTION

This invention relates to equipment mounting structures and more particularly to quick release mounting of equipment items to fixtures such as walls or pipes.

BACKGROUND

Many important and often critical equipment items are only occasionally used such as rescue equipment and fire fighting equipment including fire extinguishers, axes, and hoses. Such items are often stored in an out of the way but readily available location in case of an emergency. This is especially true aboard vehicles and vessels such as ships where rescues and fire fighting require a rapid response where all too often lives may be at stake. Because of the pitching and rolling of the ship-board environment, items require secure mounting while still providing the ability to rapidly de-mount the item for use.

Most prior art mounting systems use highly specialized mounting equipment specifically made for a particular equipment item. For example, a quick-release bracket system that may work well for one size or type of fire extinguisher may be wholly inadequate for another size or type. This can increase the cost of most specialized mounting equipment and ultimately can adversely impact the proper and safe equipping of a vehicle or vessel. High cost of specialized mounting systems and their installation and maintenance can prevent the abundant use of such items and thus jeopardize safety.

For example, fire extinguishers are often either kept in a dedicated, wall-mounted box or by a specialized steel belt using a snap-release clamp. Such specialized mounting hardware often requires installation by a skilled workman with specialized knowledge of the capabilities of the supporting fixture. Some mounting systems involve frangible structures such as break away glass which can be difficult, costly and time-consuming to reset for future use. In addition, rescue equipment such as fire extinguishers must be regularly checked to confirm they are in a useful condition. Periodic equipment checks may require removal and replacement of the equipment from its mounting location. This process can be time-consuming, and may require expensive reinstallation.

Hospital magnetic resonance imaging (MRI) facilities are operated under strict guidelines to avoid damage and injuries due to the strong magnetic fields generated by MRI machines. Consequently, specialized magnetically compliant emergency equipment such as oxygen bottles and other life support equipment is often the only type usable in the MRI facility setting. Thus, there is a need to provide mounting of such compliant equipment within easy reach of support personnel in a rapidly deployable manner.

Therefore, there is a need for a quick release equipment mount which addresses some or all of the above identified inadequacies.

SUMMARY

The principal and secondary objects of the invention are to provide an improved quick release equipment mount. These and other objects are achieved by providing a universal-type fixture-attached support module which is adapted to releasably engage one or more of a plural number of item-attached modules.

In some embodiments an equipment item can therefore be quickly and releasably attached and detached from the fixture. In some embodiments a specific equipment item-attach module is particularly adapted to securing equipment such as fire extinguishers using a commensurately shaped and dimensioned interface segment.

In some embodiments there is provided a device for rapidly mounting, de-mounting and remounting a item of equipment to a fixture, said device comprises: a support module, securable to said fixture; an item module, securable to said item of equipment; wherein said support module comprises: a base plate; a tongue extending substantially orthogonally from said base plate, wherein said tongue is elongated along an elongation axis; a first prominence extending from said tongue perpendicular to said elongation axis; a second prominence extending from said tongue perpendicular to said elongation axis; wherein said first and second prominences are spaced apart along said elongation axis; wherein said item module comprises: a first hook structure shaped, dimensioned and oriented to engage said first prominence along a direction substantially perpendicular to said elongation axis; and, a second hook structure shaped, dimensioned and oriented to matingly engaged said second prominence along a direction substantially parallel to said elongation axis.

In some embodiments said base plate comprises a substantially planar outer surface.

In some embodiments said first prominence extends from said tongue substantially parallel to said outer surface.

In some embodiments said second prominence extends from said tongue substantially parallel to said outer surface.

In some embodiments said first prominence comprises first and second coaxial posts extend from opposite sides of said tongue, wherein said posts extend substantially orthogonally to said elongation axis.

In some embodiments said support module further comprises at least one elongated strap opening extending laterally through said tongue.

In some embodiments said at least one strap opening is located at a junction between the tongue and the base plate whereby a smooth continuous surface extends from an outer surface of said base plate through said at least one opening.

In some embodiments said item module comprises a pair of rails parallelly spaced apart to form a groove therebetween, wherein said groove is dimensioned to be intimately and slidingly engaged by said tongue.

In some embodiments said item module is a cradling-type item module comprising a cradle structure having a concave bearing surface oriented to bear against a convex surface of said item of equipment within a range of sizes.

In some embodiments said item module is a wrap-around-type item module comprising a substantially cylindrical barrel structure dimensioned to intimately surround and bear against a surface of said item of equipment.

In some embodiments there is provided a quick release equipment mount comprises: a support module securable to a fixture such as a wall or pipe; said support module comprises: a substantially vertical tongue extending substantially orthogonally from a base; two pair of spaced apart posts extending laterally from said tongue; a number of item modules, wherein each one of said number of item modules comprises: an equipment item interfacing segment attachable to an item of equipment; a support module interfacing segment comprising: a pair of rails spaced to form a groove slidingly engaged by said tongue; two pair of vertically spaced apart hooks shaped, dimensioned and located to releasably secure to said posts.

The original text of the original claims is incorporated herein by reference as describing features in some embodiments.

BRIEF DESCRIPTION OF THE DRAWINGS

FIG. 2 is a diagrammatic side view of a quick release equipment mount including a fixture-attached support module and a wrap-around-type item module attached to an exemplary fire extinguisher, where the item module is in a disengaged position.

FIG. 3 is a diagrammatic side view of a quick release equipment mount including a support module and a wrap-around-type item module in an engaged position.

FIG. 4 is a diagrammatic top view of a quick release equipment mount including support module and a cradling-type item module in a disengaged position.

DESCRIPTION OF THE EXEMPLARY EMBODIMENTS

Figure 1:
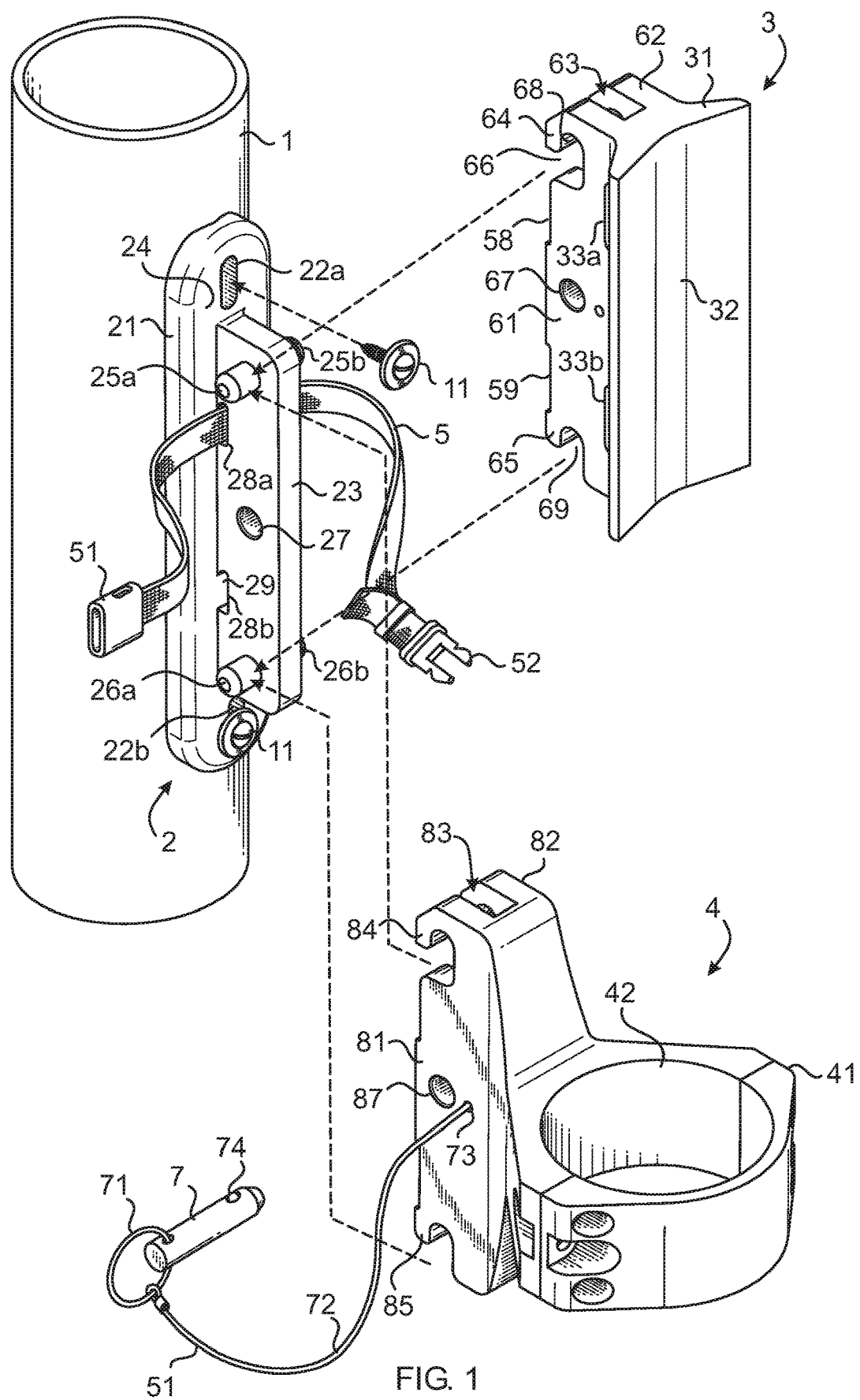
FIG. 1 is a diagrammatic perspective view of a quick release equipment mount including a fixture-attached support module and two different item modules for attaching to equipment items.

Referring now to FIGS. 1-4, there is shown a support module 2 which can be fixed to a stationary fixture structure 1 such as a wall, or pipe. The support module provides rugged structural features that can be readily engaged and disengaged by an item module 3,4 attached to a item of equipment, thereby allowing that item of equipment to be mounted to and de-mounted from the structure.

The support module 2 includes a generally oblong oval base 21 plate including dual oval attachment holes 22a,22b at opposite ends to be engaged by screws or other semi-permanent fasteners 11. A generally vertically oblong quadrangular rigid tongue 23 extends orthogonally frontwardly from the front surface 24 of the base plate between the attachment holes. A first pair of cylindrical engagement posts 25a,25b extend laterally from near the top end of the tongue. A second, similar pair of cylindrical engagement posts 26a,26b extend laterally from near the bottom end of the tongue. Each pair of posts can function as a prominence extending laterally from the tongue perpendicular to the elongation axis of the tongue, and can be substantially parallel to the front surface of the base. A lock hole 27 penetrates laterally through the tongue in a medial section. A pair of oblong spaced apart strap openings 28a,28b extend laterally through the tongue where the tongue connects at a junction to the base plate providing a smooth continuous surface 29 from the front surface of the base plate through the openings. In this way, a strap 5 can be conveniently and unimpededly threaded through a strap opening.

Various types of item modules 3,4, each attached to an item of equipment, such as a fire extinguisher, can be readily and quickly engaged or disengaged from the support module 2.

Each item module 3,4 can secure to the item of equipment by an equipment item interfacing segment attached thereto. In the case of the wrap-around-type item module 4, the equipment item interfacing segment 41 includes a cylindrical barrel structure 42 shaped and dimensioned to securely wrap around the cylindrical portion of an item of equipment 6. For example, a hand-carryable fire extinguisher having a cylindrical tank can be secured to the wrap-around-type item module having a commensurately dimensioned barrel structure. The cylindrical axis of the barrel structure can be parallel with the elongation axis of the base while the item module is mounted to the support module in order to reduce the profile of the mounted equipment.

In the case of the cradling-type item module 3, the equipment item interfacing segment 31 includes cradle structure 32 having an outwardly facing concave surface which can bear against a range of shapes and sizes of convex surfaces on the item of equipment being mounting. Strap openings 33a,33b are provided for straps to secure the equipment to the cradle structure.

Each item module 3,4 includes a support module interfacing segment having structures which securely and ruggedly engage the structural features on the support module 2. Specifically, the cradling-type item module 3 can include a pair of oblong rails 61,62 extending backwardly from the equipment interfacing segment. The rails are spaced apart a fixed width W to form a groove 63 which is sized to be intimately engaged by the tongue of the support module having a thickness T commensurate with the width. This helps prevent yaw and roll movement of the item module with respect to support module in order to prevent jamming during a potentially urgent disengagement process. It does however allow vertical sliding movement and relative pitch movement between the modules.

The cradling-type item module 3 can be releasably attached to the support module 2 by two pair of specially shaped and oriented hooks 64,65 formed into opposite ends of the rails 61,62. A top pair of hooks 64 engage the upper posts 25a,25b of the support module. A bottom pair of hooks 65 engage the lower posts 26a,26b of the support module. Each of the top pair of hooks is formed by an L-shaped prong forming a backward facing inlet 66 and an upper catch 68. Each of the bottom pair of hooks is formed by a crook 69 formed into the bottom surface of each respective rail. In this way, the item module is mounted to the support module by first aligning the tongue with the groove, vertically aligning the inlets of the top hooks with the upper posts, moving the item module backwardly so that the upper posts engage the inlet completely. Then the item module is translated vertically downwardly causing the upper posts to matingly engage the upper catches in the top hooks, and causing the lower posts to matingly engage the crooks of the bottom hooks. Pairs of longitudinal notches 58,59 set into the back surface of the rails allow an uncrimped passageway for straps such as the attachment strap 5 threaded upon the support module.

The wrap-around-type item module 4 includes a support module interfacing segment having structures similar to the cradling-type item module 3 for securely and ruggedly engaging the structural features on the support module 2, such as a pair of oblong rails 81,82 extending backwardly from the equipment interfacing segment 41. The rails are spaced apart a fixed width W to form a groove 83 which is sized to be intimately and slidingly engaged by the tongue of the support module having a thickness T commensurate with the width. The rails include two pair of specially shaped and oriented hooks 84,85 formed at their opposite ends operating similarly to the pairs of hooks on the cradling-type item module.

A lock hole 87 penetrates laterally through a vertically medial section of the rails 81,82 so that the lock holes of an item module are in alignment with the lock hole 27 of the support module when the two modules are in the engaged configuration. The aligned holes can be penetrated by a locking pin 7 to lock the items together in the engaged configuration. To disengage the items, the locking pin is first removed. Removal of the locking pin can be facilitated by an end ring 71 connected to the pin. Loss of the pin is prevented by a leash 72 connecting the ring to the item module at a leash attachment hole 73. A spring-loaded retractable friction ball 74 retains the locking pin within the holes until a sufficient extraction force is applied. The cradling-type item module can use a similarly shaped, dimensioned and located lock hole 67 to further secure the engaged modules.

This relatively complex engagement provides for a consequently rapid and simple, disengagement process. The user can simply grasp the item of equipment, lift it slightly, and move it outwardly from the support module. This motion ensures that the user is adequately supporting the item of equipment before it becomes disengaged from the fixture, thereby enhancing safety.

Alternately, the item module can be releasably attached to the item of equipment. For example, in the case of the cradling-type item module, quick release straps can be provided for securing the item of equipment such as a fire extinguisher against the cradle portion. The straps can be disengaged from the equipment, and the equipment removed from the mount altogether so that the cradling-type item module remains attached to the support module. Alternately, in the event of a more urgent emergency, the equipment can remain attached to the cradling-type module while it is detached from the support module. This flexibility provides an advantage over other mounting systems.

Another advantage of the present mounting system is that both the cradling-type item module 3 and the wrap-around-type item module 4 can be used with the same support module. This greatly facilitates the rapid and simple interchange of fresh or upgraded equipment more suited to the expected uses depending on changing circumstances.

Another advantage of the present mounting system is that it can be fabricated from non-ferrous materials such as magnetically neutral metals such as aluminum and titanium, magnetically neutral fiber-resin composites, and plastics, so that the system can be employed in a magnetically restricted setting such as a hospital MRI facility.

Although the above utilitarian aspects have been described in connection with a quick release mounting of hand-carryable emergency equipment, it shall be understood that the system is readily adaptable to the mounting of other types of equipment that require regular interchange such as other fire fighting equipment, construction or repair equipment, and life sustaining equipment for example.

Another advantage enjoyed by the instant embodiments is that no change of the base module is required during interchange of different types of equipment items. Further, there are far fewer occasions when skilled personnel are required to install the mount upon a fixture, and a significantly lower chance that an error has been made during installation.

While the exemplary embodiments of the invention have been described, modifications can be made and other embodiments may be devised without departing from the spirit of the invention and the scope of the appended claims.

What is claimed is:

1. A device for rapidly mounting, de-mounting and remounting a item of equipment to a fixture, said device comprises:
   a pair of interlocking separatable modules securable to said fixture and to said item of equipment;
   wherein a first one of said pair of interlocking separatable modules comprises:
      a base plate;
      a tongue extending substantially orthogonally and frontwardly from said base plate, wherein said tongue is elongated along an elongation axis;
      a first prominence extending from said tongue perpendicular to said elongation axis;
      a second prominence extending from said tongue perpendicular to said elongation axis;
      wherein said first and second prominences are spaced apart along said elongation axis;
   wherein a second one of said pair of interlocking separatable modules comprises:
      a pair of rails parallelly spaced apart to form a groove therebetween, wherein said groove is dimensioned to be intimately and slidingly engaged by said tongue;
      wherein a first one of said pair of rails comprises:
         a first hook structure having an inlet facing backward toward said base plate;
         said first hook structure being shaped, dimensioned and oriented to engage said first prominence along a direction substantially perpendicular to said elongation axis; and,
         a second hook structure formed into a bottom surface of said first one of said pair of rails;
         said second hook structure being shaped, dimensioned and oriented to matingly engaged said second prominence along a direction substantially parallel to said elongation axis; and,
   wherein either one of said pair of interlocking separatable modules further comprises a cradle structure having a concave bearing surface oriented to bear against a convex surface of said item of equipment within a range of sizes.

2. The device of claim 1, wherein said base plate comprises a substantially planar outer surface.

3. The device of claim 2, wherein said first prominence extends from said tongue substantially parallel to said outer surface.

4. The device of claim 3, wherein said second prominence extends from said tongue substantially parallel to said outer surface.

5. The device of claim 1, wherein said first prominence comprises first and second coaxial posts extend from opposite sides of said tongue, wherein said posts extend substantially orthogonally to said elongation axis.

6. The device of claim 1, wherein said device further comprises at least one elongated strap opening extending laterally through said tongue.

7. The device of claim 6, wherein said at least one strap opening is located at a junction between the tongue and the base plate whereby a smooth continuous surface extends from an outer surface of said base plate through said at least one opening.

8. The device of claim 1, which further comprises:
   a locking pin penetrating through aligned holes in said pair of rails and said tongue;
   said locking pin comprising a spring-loaded retractable friction ball resisting extraction of said locking pin from said aligned holes;

an end ring connected to said locking pin; and,
a leash connecting said end ring to said pair of interlocking separatable modules.

9. A device for rapidly mounting, de-mounting and remounting a item of equipment to a fixture, said device comprises:
a pair of interlocking separatable modules securable to said fixture and to said item of equipment;
wherein a first one of said pair of interlocking separatable modules comprises:
a base plate;
a tongue extending substantially orthogonally and frontwardly from said base plate, wherein said tongue is elongated along an elongation axis;
a first prominence extending from said tongue perpendicular to said elongation axis;
a second prominence extending from said tongue perpendicular to said elongation axis;
wherein said first and second prominences are spaced apart along said elongation axis;
wherein a second one of said pair of interlocking separatable modules comprises:
a pair of rails parallelly spaced apart to form a groove therebetween, wherein said groove is dimensioned to be intimately and slidingly engaged by said tongue;
wherein a first one of said pair of rails comprises:
a first hook structure having an inlet facing backward toward said base plate;
said first hook structure being shaped, dimensioned and oriented to engage said first prominence along a direction substantially perpendicular to said elongation axis; and,
a second hook structure formed into a bottom surface of said first one of said pair of rails;
said second hook structure being shaped, dimensioned and oriented to matingly engaged said second prominence along a direction substantially parallel to said elongation axis; and,
wherein either of said pair of interlocking separatable modules further comprise a substantially cylindrical barrel structure dimensioned to intimately surround and bear against a surface of said item of equipment.

10. The device of claim 9, wherein said base plate comprises a substantially planar outer surface.

11. The device of claim 10, wherein said first prominence extends from said tongue substantially parallel to said outer surface.

12. The device of claim 11, wherein said second prominence extends from said tongue substantially parallel to said outer surface.

13. The device of claim 9, wherein said first prominence comprises first and second coaxial posts extend from opposite sides of said tongue, wherein said posts extend substantially orthogonally to said elongation axis.

14. The device of claim 9, wherein said device further comprises at least one elongated strap opening extending laterally through said tongue.

15. The device of claim 14, wherein said at least one strap opening is located at a junction between the tongue and the base plate whereby a smooth continuous surface extends from an outer surface of said base plate through said at least one opening.

16. The device of claim 9, which further comprises:
a locking pin penetrating through aligned holes in said pair of rails and said tongue;
said locking pin comprising a spring-loaded retractable friction ball resisting extraction of said locking pin from said aligned holes;
an end ring connected to said locking pin; and,
a leash connecting said end ring to said pair of interlocking separatable modules.

* * * * *